United States Patent
Guthrie et al.

(10) Patent No.: US 7,603,676 B2
(45) Date of Patent: ***Oct. 13, 2009

(54) ASP.NET HTTP RUNTIME

(75) Inventors: Scott D. Guthrie, Bellevue, WA (US); Dmitry Robsman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

This patent is subject to a terminal disclaimer.

(21) Appl. No.: 11/621,435

(22) Filed: Jan. 9, 2007

(65) Prior Publication Data

US 2007/0174845 A1 Jul. 26, 2007

Related U.S. Application Data

(63) Continuation of application No. 09/894,828, filed on Jun. 29, 2001, now Pat. No. 7,162,723.

(51) Int. Cl.
*G06F 13/00* (2006.01)
(52) U.S. Cl. ............. 719/318; 719/316; 719/331; 709/227; 709/230
(58) Field of Classification Search ............ 719/316, 719/318, 331; 709/227, 230
See application file for complete search history.

(56) References Cited

U.S. PATENT DOCUMENTS

| | | | | |
|---|---|---|---|---|
| 6,487,590 B1 * | 11/2002 | Foley et al. | | 709/223 |
| 7,206,805 B1 * | 4/2007 | McLaughlin, Jr. | | 709/203 |
| 7,228,346 B1 * | 6/2007 | Allavarpu et al. | | 709/223 |

* cited by examiner

*Primary Examiner*—Andy Ho
(74) *Attorney, Agent, or Firm*—Merchant & Gould P.C.

(57) ABSTRACT

An HTTP request handling runtime includes a context object and an event pipeline for processing an HTTP request received at a host application from a client application. The context object logically represents the HTTP request and encapsulates at least one property associated with the received HTTP request. The context object is processed by the event pipeline, which includes a plurality of synchronous and/or asynchronous request events. A callback is generated when a request event is raised and when at least one application and/or module is registered with the request event. Each callback instantiates each application and module that is registered with the request event for processing the context object. The plurality of request events can include events that are in a deterministic order and/or request events that are in a non-deterministic order, such as an error event.

32 Claims, 3 Drawing Sheets

ASP.NET HTTP RUNTIME

CROSS REFERENCE TO RELATED APPLICATIONS

This application is a continuation of U.S. patent application Ser. No. 09/894,828, filed on Jun. 29, 2001, now U.S. Pat. No. 7,162,723, which is hereby incorporated by reference it its entirety as if set forth herein in full.

BACKGROUND OF THE INVENTION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to Hypertext Transfer Protocol (HTTP) request processing. More particularly, the present invention relates to a system and method for processing an HTTP request.

BACKGROUND OF THE PRIOR ART

FIG. 2 shows a functional block diagram of a website application that processes an HTTP request in a conventional manner. A web browser 201 located at a client computer 202 sends an HTTP request over a computer network 203, such as the Internet, in a well-known manner to a host server computer 204 for a selected URL 205. Host server computer 204, which runs an application 206 that is particular to host server computer 204, receives the HTTP request, and based on the contents of the request and the processing of application 206, accesses the content of requested web page 205. Before the response to the HTTP request is sent to web browser 201 by web server 207, application 206 creates the requested web page 205 using software running on host server computer 204 and, depending upon the content of web page 205, a web service 208, such as a web service proxy.

Application 206 can also process the request in a selected manner before and/or after the software funning on host server computer 204 creates the requested page by using functional modules 209, for example, for authenticating the requesting user, determining whether the requesting user is authorized to access the requested web page, encrypting the response, etc. Functional modules 209, such as JAVA servlets, process an HTTP request in a sequential manner. That is, functional module 209a is selected to process the request before functional module 209b processes the request, and functional module 209c, in turn, is selected to process the request after functional module 209b. For example, functional module 209a could provide user authentication for application 206. Once the user has been authenticated, functional module 209b could provide user authorization. Subsequently, functional module 209c could provide advertising functionality that is based on the authenticated identification of the requesting user.

When an HTTP application developer needs to change the functionality of application 206 by changing the functionality of modules 209 to include customized features, such as custom logging, Internet-scale security, or data caching, the developer would need to custom generate the functional module and/or use a suitable functional module that was developed by a third party.

A problem with this conventional approach is that an application developer must fully understand the processing of all other functional modules so that a new functional module does conflict with the other functional modules already in place. Moreover, it is difficult for the application developer to know exactly where in the processing sequence to insert a new or an updated functional module. Further, in situations a functional module presends content and/or headers to a requesting user before the software running on host server computer 204 creates the requested web page so that the website appears to the user to be a relatively fast website. Any request processing that is performed by a functional module that is later in the conventional processing sequence can no longer be performed because the content and/or the headers are no longer available for processing.

What is needed is a way for an HTTP application developer to easily add functionality to an HTTP application. Additionally, what is needed is a way to create reusable functionality between applications that that HTTP modules developed by different module developers can coexist together in many HTTP applications. Moreover, what is needed is a way to provide processing of an HTTP request that avoids a sequential arrangement of functional modules that may possibly conflict with other functional modules.

BRIEF SUMMARY OF THE INVENTION

The present invention provides a way for an HTTP application developer to easily add functionality to an HTTP application. Additionally, the present invention provides a way to create reusable functionality between applications that that HTTP modules developed by different module developers can coexist together in many HTTP applications. The present invention also provides a way to provide processing of an HTTP request that avoids a sequential arrangement of functional modules that may possibly conflict with other functional modules.

To achieve these advantages, the present invention provides an application runtime for responding to an HTTP request by exposing an object-oriented, event-driven infrastructure so that HTTP applications and HTTP modules can participate during different stages of the request/response cycle. That is, methods are registered for a callback when either a synchronous or an asynchronous request event is raised during the lifetime of an HTTP request.

According to the invention, an HTTP request handling runtime includes a context object and an event pipeline. The context object is created by parsing an HTTP request that is received at a host application from a client application and logically represents the HTTP request. The context object preferably encapsulates the properties associated with the received HTTP request. The context object is processed by the event pipeline, which includes a plurality of request events. The pipeline processes one HTTP request at a time, and when the pipeline is done processing an HTTP request, another HTTP request is processed. Each request event has a corresponding event and generates a callback when the event corresponding to the request event is raised and when at least one application or module is registered in association with the request event. Each callback instantiates each module that is registered in association with the request event for processing the context object. Preferably, the plurality of request events includes events that are either synchronous and/or asynchronous in a deterministic order. Further, the plurality of request events can include at least one request event that has a non-deterministic order, such as an error event. According to the invention, a module can be registered with a plurality of request events.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Figure 1:
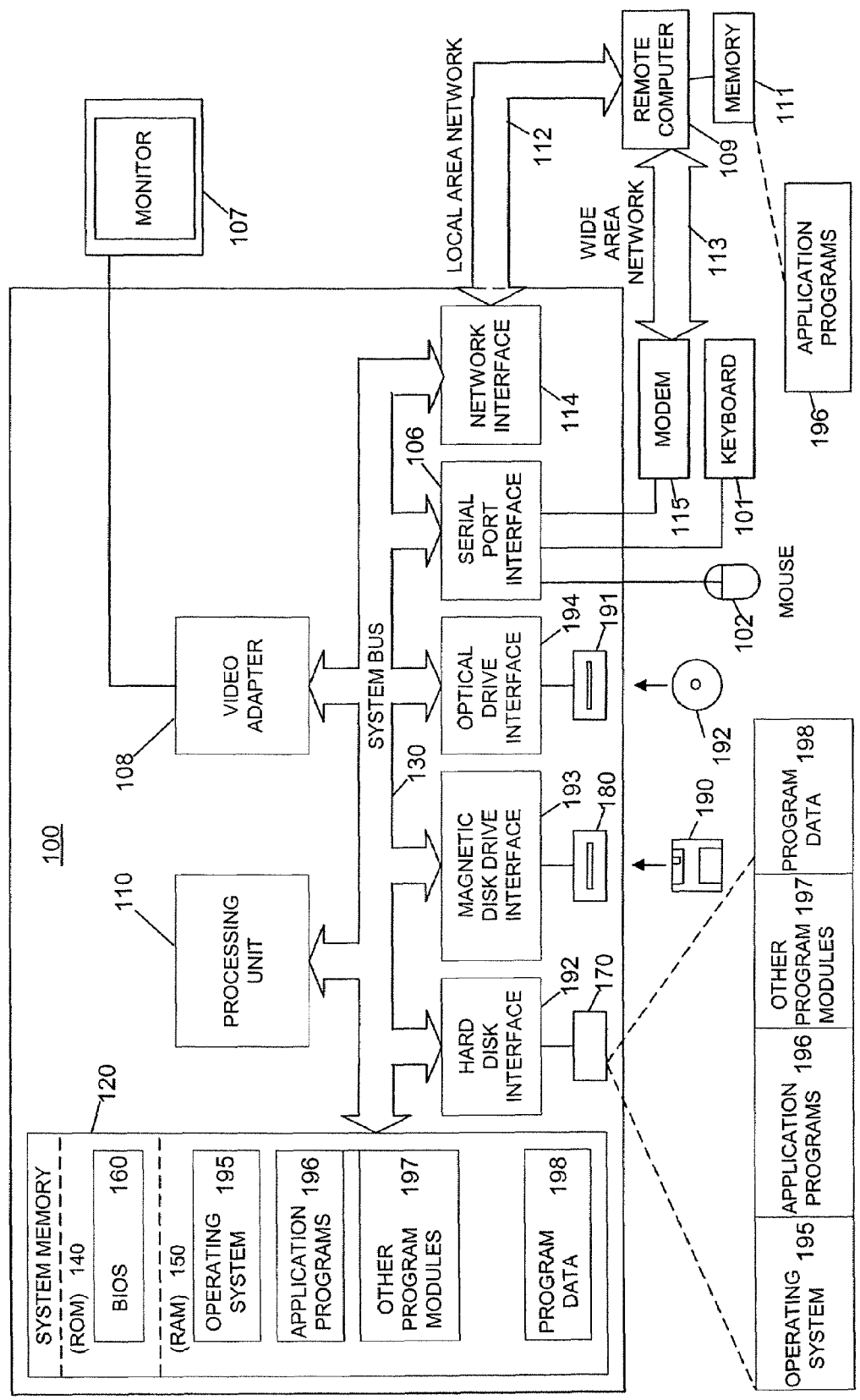
FIG. 1 shows a schematic diagram of a conventional general-purpose digital computing environment that can be used for implementing various aspects of the present invention.
Figure 2:
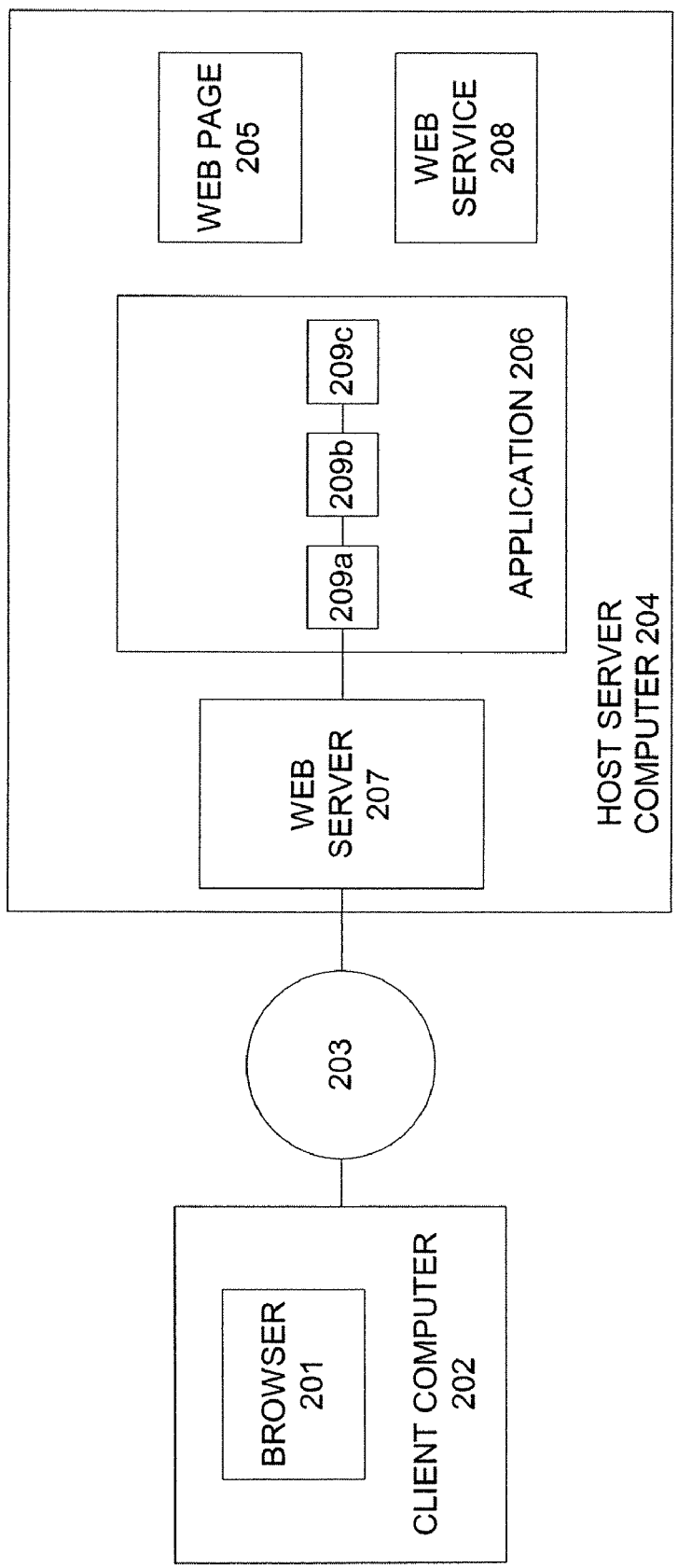
FIG. 2 shows a functional block diagram of a website application that processes an HTTP request in a conventional manner.

The present invention maybe more readily described with reference to FIGS. 1 and 3. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to processing unit 110. System bus 130 may be any of several types of bus structures including a memory bus or memory controller, a peripheral bus, and a local bus using any of a variety of bus architectures. System memory 120 includes read only memory (ROM) 140 and random access memory (RAM) 150.

A basic input/output system 160 (BIOS), containing the basic routines that help to transfer information between elements within computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. Hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on hard disk drive 170, magnetic disk 190, optical disk 192, ROM 140 or RAM 150, including an operating system 195, one or more application programs 196, other program modules 197, and program data 198. A user can enter commands and information into computer 100 through input devices such as a keyboard 101 and pointing device 102. Other input devices (not shown) may include a microphone, joystick, game pad, satellite dish, scanner or the like. These and other input devices are often connected to processing unit 110 through a serial port interface 106 that is coupled to the system bus, but may be connected by other interfaces, such as a parallel port, game port or a universal serial bus (USB). Further still, these devices maybe coupled directly to system bus 130 via an appropriate interface (not shown). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local area network 112 through a network interface or adapter 114. When used in a WAN networking environment, personal computer 100 typically includes a modem 115 or other device for establishing a communications over wide area network 113, such as the Internet. Modem 115, which may be internal or external, is connected to system bus 130 via the serial port interface 106. In a networked environment, program modules depicted relative to personal computer 100, or portions thereof, may be stored in a remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A primary aspect of the invention provides an event-based application runtime for responding to an HTTP request. More specifically, the ASP.NET HTTP Runtime of the present invention exposes an object-oriented, event-driven infrastructure to application developers for creating advanced applications that participate during different stages of the request/response cycle. For example, the ASP.NET HTTP runtime of the present invention allows an application developer to develop an HTTP application and/or a module developer to develop a reusable HTTP module for intercepting, participating with and/or modifying each individual HTTP request using applications written in any of the .NET languages. To achieve this, the present invention enables an HTTP application developer and/or an HTTP module developer to register methods that are called at specific stages during the lifetime of an HTTP request into an application. The infrastructure into which methods are registered is the logical .NET replacement for a conventional web server Application Program Interface (API) filter. Moreover, the present invention allows the functionality of ASP.NET to be changed. For example, when ASP.NET does not provide sufficient functionality in a particular area, a developer can change the underlying application infrastructure at a level that was once reserved for a subset of developers having more knowledge of the underlying infrastructure.

Figure 3:
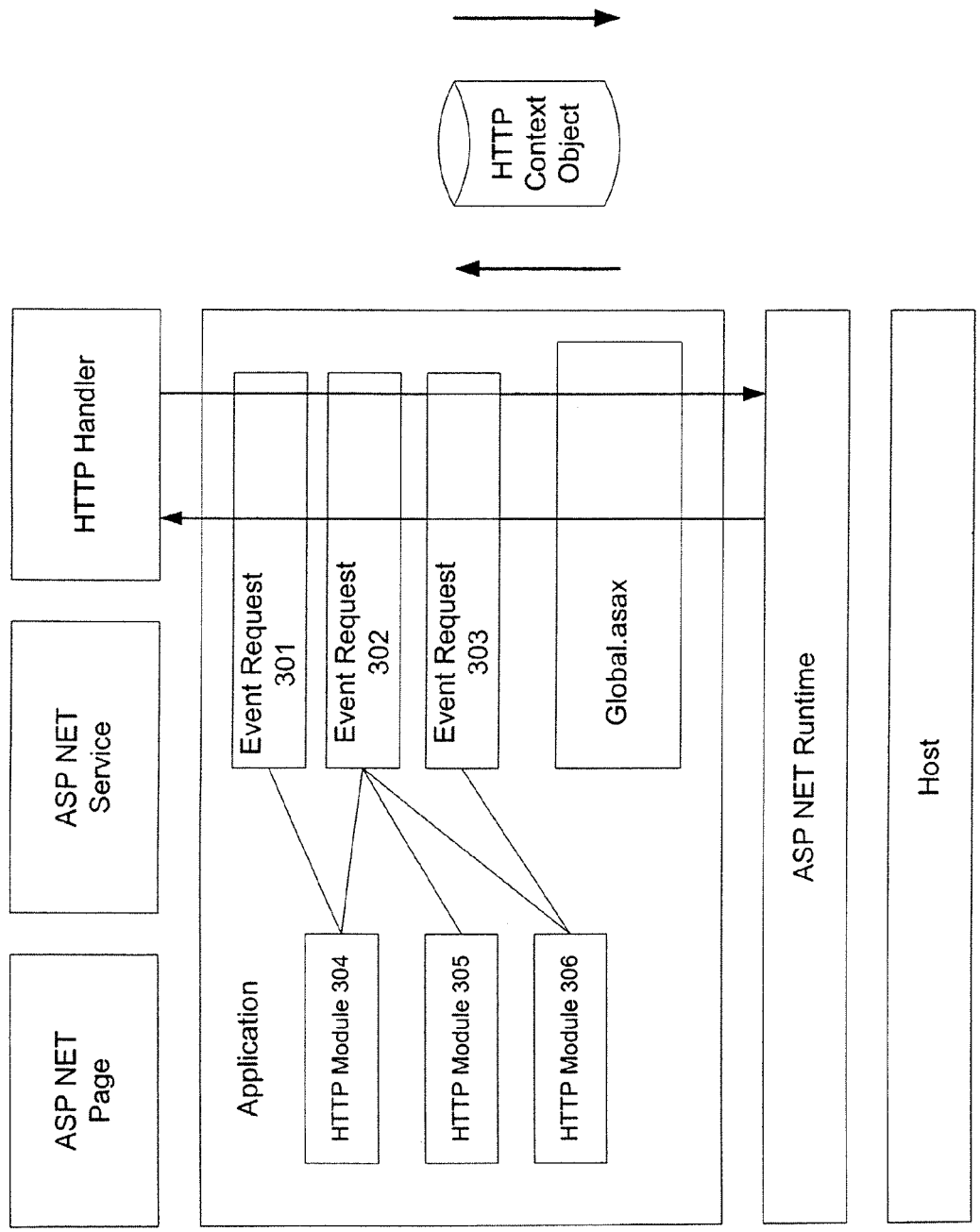
FIG. 3 shows a functional block diagram of a website application that processes an HTTP request using an ASP-.NET HTTP runtime according to the present invention.

FIG. 3 shows a functional block diagram of a website application that processes an HTTP request using an ASP-.NET HTTP runtime according to the present invention.

The architecture of the ASP.NET HTTP request processing runtime provides an application that creates an HTTP Context object from an HTTP request and an event pipeline that generates callbacks during the lifetime of the HTTP Context object (i.e., the lifetime of the HTTP request). The HTTP Context object logically represents a received HTTP request by encapsulating all of the properties that are associated with the received HTTP request and that are needed for processing the request. The callbacks are used by HTTP applications and by HTTP Modules that register for events when the modules are initialized. A GLOBAL.ASAX is not needed for registering events because the GLOBAL.ASAX contains application code that is compiled on the fly that can include event handlers for any pipeline event. The event handlers are automatically hooked via naming conventions. For example, when application code (that could be in GLOBAL.ASAX or precompiled) contains a method named Application_BeginRequest, the application code will be automatically hooked up to BeginRequest event. Thus events could be handled either in modules or in application code. Preferably, modules are used because modules are reusable between several applications. The present invention generates an instantiation of the event pipeline for processing a plurality of HTTP requests that are received.

The event pipeline provides an event-based architecture that includes a plurality of request events for generating a callback when the request event is raised. Each HTTP Module that is registered with one or more request events is instantiated when the pipeline is instantiated. Thus, an application developer can develop an application that intercepts, participates with or modifies a request at a selected event during the lifetime of the request. Similarly, an HTTP module developer can develop an HTTP module that intercepts, participates with or modifies a request at a selected event during the lifetime of the request. Moreover, an application can terminate further processing of the request by calling a Response.End( ) method depending upon the request event that is raised. The last event executed is always an EndRequest event so that a module can perform a clean up operation.

Referring again to FIG. 3, a Host, which is running, for example, IIS (Internet Information Server) 5 or IIS6, receives an HTTP request (not shown in FIG. 3). The received request is passed to the ASP.NET runtime of the present invention where the request is parsed in a well-known manner to create an HTTP Context object encapsulating all of the properties that are associated with the received HTTP request that are needed for processing the request. An application is instantiated and processing of the request proceeds "toward" the HTTP handler through the event pipeline (represented by Request Events 301 and 302). As the lifetime of the request advances through the event pipeline, each of the deterministic request events is raised. HTTP modules that are registered with a particular request event, or have event sinks contained in the Global:asax, are called when the particular request event is raised. After the HTTP handler generates the requested web page, processing continues through the event pipeline. When all request events have been raised and all HTTP modules have processed the request, the Host responds to the request by sending the requested (and processed) web page.

It should be understood that while only three Request Events 301, 302 and 303 and three HTTP modules 304, 305 and 306 are shown in FIG. 3, fewer or more Request Events and fewer or more HTTP Modules could be used. It should be understood that more than one HTTP module could be registered with a particular request event. FIG. 3 depicts an exemplary registration of HTTP modules 304-306 with request events 301-303. A line extending between an HTTP module and a request event represents a registration. In FIG. 3, three exemplary HTTP modules 304, 305 and 306 are each registered with request event 302 so that all three modules 304-306 process an HTTP request based on the same callback that is raised by request event 302. HTTP Module 305 is shown as being registered with only one request event. An HTTP module could also be registered with more than one request event so that the HTTP module receives as many callbacks as modules that it is registered with. For example, FIG. 3 shows that HTTP module 304 is registered with request events 301 and 302. Similarly, HTTP module 306 is registered with request events 302 and 303.

According to the invention, the event pipeline preferably includes ten deterministic request events and three non-deterministic request events. Moreover, the deterministic request events can be synchronous or asynchronous request events. The (synchronous) deterministic events, in preferred order, include:

BeginRequest
AuthenticateRequest
AuthorizeRequest
ResolveRequestCache
AcquireRequestState
PreRequestHandlerExecute
PostRequestHandlerExecute
ReleaseRequestState
UpdateRequestCacheEndRequest
EndRequest Of course, the order of the deterministic request events can be rearranged depending on the requirements of the application. The non-deterministic request events include:

Error
PreSendRequestContent
PreSendRequestHeaders

It should also be understood that fewer, more and/or other deterministic and non-deterministic request events could be included in the event pipeline for generating callbacks.

The BeginRequest event is raised when the processing of an HTTP request begins. The AuthenticateRequest event is raised at a point during the lifetime of the HTTP request in which the application needs to authenticate a user. The AuthorizeRequest event is raised when the application needs to determine whether a user is authorized to receive a response to a particular request. The ResolveRequestCache event is raised when the application is required to determine whether all of the response to the request has been cached, thereby possibly reducing the time required to create the requested page and return a response to the requesting user. At this point, the HTTP handler is created. The AcquireRequestState event is raised to acquire an additional state that is associated with the client connection, list ASP.NET session state. Personalization modules might, for example, use the AcquireRequestState event. The AcquireRequest State event is raised after the HTTP handler is created so that a module can examine the HTTP handler and decide the kind of state that is needed. The PreRequestHandlerExecute event is raised prior to when the request handler creates the requested web page. In a similar manner, the PostRequestHandlerExecute event is raised when the request handler has completed creating the requested web page. The ReleaseRequestState event is raised to give a module an opportunity to save any state changes acquired in AcquireRequestState. For example, a session state module can use the ReleaseRequestState event to save session data. The UpdateRequestCache event is raised when, during the processing of the request, the cache should be updated to save the response so that the response could later (for subsequent HTTP requests for the same page) be found in ResolveRequestCache, if the response is cacheable. Lastly, the EndRequest event is raised when the processing of the request is complete.

The non-deterministic Error event is raised when an error condition occurs, such as when an exception condition is generated that is not caught by, for example, the application code. The PreSendRequestContent event is raised when content is starting to be sent to the requesting client before the HTTP handler processes the request. Similarly, the PreSendRequestHeaders event is raised when headers are starting to be sent to the requesting client before the HTTP handler processes the request. The purpose of the PreSendRequestContent and PreSendRequestHeader request events are so other methods can process the content and/or headers before the content and/or headers are sent to the requesting client application. As previously noted, in situations when a functional module presends content and/or headers before the HTTP handler creates the requested web page, any processing that is performed by a functional module that is later in a conventional processing sequence is not performed because the content and/or the headers are no longer available for processing.

Interception events can be effectively used for wrapping an application with intelligent error handling code. In the situation when something unexpected occurs in an application and the Error event is raised, the present invention provides a developer with the flexibility to decide how to handle the unexpected condition. For example, the current state of all of the currently logged-on users could be logged to an XML file, in addition to logging the error and notifying a system administrator. When the error condition is rectified and the application begins executing normally, the application can be designed to contact any end-users who were dropped because of the error condition using the XML file.

Interception events can be developed using either the Global.asax application file or can be precompiled components that implement the IHttpModule interface. The following pseudo code, based on the Microsoft VISUAL BASIC Brand programming language, sets forth an exemplary Global.asax:

```
<script language= "VB" runat=server>
    Sub Application_Start( )
        ' Run code when application starts
    End Sub
    Sub Application_BeginRequest( )
        Response.Write("Request Processing Beginning!")
    End Sub
    Sub Application_End( )
        " Run code when application starts
    End Sub
</script>
```

HTTP modules are created as classes that implement the System.Web.IHttpModule interface, and use the Init( ) method for syncing to any HTTPApplication event. The following pseudo code is an example of an HTTPModule:

```
public interface IHttpModule
{
    public void Init(HttpApplication application);
    public void Dispose( );
}
```

An HTTPModule is compiled and a .Net Library DLL is deployed within the "bin" directory under the application vroot. The HTTPModule is registered in config.web using the following exemplary pseudo code:

```
<configuration>
    <httpModules>
        <add type=" myType,myAssembly" name="myModule"/>
    <httpModules>
</configuration>
```

Within the process running ASP.NET process, threads are used for executing code. A thread is a resource, and there are a finite number of threads that ASP.NET will be able to use.

According to the invention, ASP.NET creates and manages a threadpool that expands and contracts the number of threads throughout the life of an application under control of an application developer.

In some cases, application code, such as network I/O, can potentially stall a thread in a process because the thread must wait (i.e., the thread is blocked) until this relatively slower network I/O operation is complete. When a thread is blocked, the thread cannot be used for servicing a request, thereby resulting in queuing of requests and degrading performance of an application because all threads are blocked while waiting instead of being busy doing work. To avoid such a situation, the present invention provides support for asynchronous events, and support for synchronous events. Consequently, the present invention supports an application that performs an operation over a network in which the network class supports IO Completion Ports, such as a web service proxy, for facilitating asynchronous IO.

The present invention also supports ten asynchronous request events that respectively correspond to each of the synchronous deterministic request events. The asynchronous request events are raised in the following order:

AddOnBeginRequestAsync
AddOnAuthenticateRequestAsync
AddOnAuthorizeRequestAsync
AddOnResolveRequestCacheAsync
AddOnAcquireRequestStateAsync
AddOnPreRequestHandlerExecuteAsync
AddOnPostRequestHandlerExecuteAsync
AddOnReleaseRequestStateAsync
AddOnUpdateRequestCacheAsync
AddOnEndRequestAsync To use asynchronous events within global.asax, the event prototype must be manually created, or wired up, into the event pipeline by overriding the Init( ) method, marked as virtual in an HTTP Application, with dedicated code. For example, to wire up the AddOnBeginRequestAsync event, which is the asynchronous version of the OnBeginRequest event, the AddOnBeginRequestAsync method of the ApplicationInstance would be called to pass in two event handlers. The following exemplary pseudo code illustrates this:

```
public override void Init( ){
    Context.ApplicationInstance.AddOnBeginRequestAsync(
        new BeginEventHandler(Begin),
        new EndEventHandler(End));
}
```

In the above exemplary pseudo code, a new BeginEventHandler and a new EndEventHandler are created by passing in two member methods (Begin and End) that are called when the event executes. An application developer would also need to implement both event handlers. For example, the Begin( ) handler uses an instance of a custom class that is defined as SimpleAsyncResult, as shown in the following exemplary pseudo code that would be done on another thread:

```
public IAsyncResult Begin(Object source, EventArgs e, AsyncCallback cb,
                    Object extraData) {
    ar = new SimpleAsyncResult(cb, extraData);
    Context.Response.Write("Asynchronous OnBeginRequest event called...<BR>");
    ar.Complete( );
    return ar;
}
```

An exemplary implementation of a class implementing the IAsyncResult interface is shown in the following pseudo code:

```
internal class SimpleAsyncResult : IAsyncResult {
    AsyncCallback _callback;
    object asyncState;
    bool isCompleted = false;
    internal SimpleAsyncResult(AsyncCallback cb, object asyncState){
        _callback = cb;
        this.asyncState = asyncState;
    }
    public object AsyncObject {get {return null;} }
    public object AsyncState {get {return asyncState;} }
    public WaitHandle AsyncWaitHandle { get { return null; } }
    public bool CompletedSynchronously { get { return false; } }
    public bool IsCompleted {get { return isCompleted; } }
    internal void Complete( ) {
        isCompleted = true;
        if(_callback != null)
            _callback(this);
    }
}
```

The End event can be used to clean up any open resources, if necessary, as illustrated by the following exemplary pseudo code:

```
public void End (IAsyncResult ar){
}
```

Because ASP.NET supports both synchronous and asynchronous application events, an application developer has more options for building an application. Coding an event to be asynchronous frees the ASP.NET worker thread to service other requests until the code executed on the asynchronous thread completes, thereby resulting in better scalability because ASP.NET threads that are used for servicing requests are not blocked.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A computer system configured to handle Hypertext Transfer Protocol (HTTP) requests, the computer system comprising:
   a processing unit that executes computer-executable instructions;
   one or more computer readable media storing computer-executable instructions that when executed by the processing unit provide an HTTP handling runtime comprising:
   a context object logically representing an HTTP request that is received at a host application from a client application, the context object encapsulating at least one property associated with the received HTTP request; and
   an event pipeline corresponding to the context object, the event pipeline having a plurality of request events, each request event having a corresponding event and generating a call-back when the event corresponding to the request event is raised and when at least one of an application and a module is registered in association with the request event, each call-back initiating each application and each module that is registered in association with the request event to process the context object.

2. The computer system according to claim 1, wherein the plurality of request events have a deterministic order.

3. The computer system according to claim 2, wherein at least one of the plurality of request events is a synchronous request event.

4. The computer system according to claim 2, wherein at least one of the plurality of request events is an asynchronous request event.

5. The computer system according to claim 2, wherein the plurality of request events further includes at least one request event having a non-deterministic order.

6. The computer system according to claim 1, wherein the plurality of request events have a non-deterministic order.

7. The computer system according to claim 6, wherein the plurality of non-deterministic order request events include an error event.

8. The computer system according to claim 1, wherein a module is registered in association with a plurality of request events.

9. The computer system according to claim 1, wherein the event pipeline is a separate instance of the event pipeline for each HTTP request that is received at the host application from a client application.

10. The computer system according to claim 1, wherein HTTP request runtime parses the received HTTP request to form the context object that logically represents the HTTP request.

11. A method for processing a Hypertext Transfer Protocol (HTTP) request received at a server computer, the method comprising steps of:
   forming, by the server computer, a context object that logically represents an HTTP request that is received at a host application running on the server computer from a client application running on a client computer, the context object encapsulating at least one property associated with the received request;

forming, by the server computer, an event pipeline corresponding to the context object, the event pipeline having a plurality of request events, and each request event having a corresponding event;

generating, by the server computer, a callback when the event corresponding to a request event is raised and when at least one of an application and a module is registered in association with the request event; and initiating, by the server computer, each application and each module that is registered in association with the request event in response to the callback for processing the context object.

12. The method according to claim 11, further comprising a step of registering a module in association with at least one selected request event.

13. The method according to claim 11, further comprising a step of registering a plurality of modules in association with a selected request event.

14. The method according to claim 11, wherein the plurality of request events have a deterministic order.

15. The method according to claim 14, wherein at least one of the plurality of request events is a synchronous request event.

16. The method according to claim 14, wherein at least one of the plurality of request events is an asynchronous request event.

17. The method according to claim 16, wherein the plurality of request events further includes at least one request event having a non-deterministic order.

18. The method according to claim 11, wherein the plurality of request events have a non-deterministic order.

19. The method according to claim 18, wherein the plurality of non-deterministic order request events include an error event.

20. The method according to claim 11, wherein the step of forming the event pipeline corresponding to the context object forms the event pipeline as a separate instance for each HTTP request received at the host application from a client application.

21. The method according to claim 11, wherein the step of forming the context object includes a step of parsing the received HTTP request to form the context object.

22. A computer-readable medium having computer-executable instructions for processing a Hypertext Transfer Protocol (HTTP) request comprising steps of:

forming a context object that logically represents an HTTP request that is received at a host application from a client application, the context object encapsulating at least one property associated with the received request;

forming an event pipeline corresponding to the context object, the event pipeline having a plurality of request events, and each request event having a corresponding event;

generating a call-back event when the event corresponding to a request event is raised and when at least one of an application and a module is registered in association with the request event; and initiating each application and each module that is registered in association with the request event in response to the callback for processing the context object.

23. The computer-readable medium according to claim 22, further comprising a step of registering a module in association with at least one selected request event.

24. The computer-readable medium according to claim 22, further comprising a step of registering a plurality of modules in association with a selected request event.

25. The computer-readable medium according to claim 22, wherein the plurality of request events have a deterministic order.

26. The computer-readable medium according to claim 22, wherein at least one of the plurality of request events is a synchronous request event.

27. The computer-readable medium according to claim 22, wherein at least one of the plurality of request events is an asynchronous request event.

28. The computer-readable medium according to claim 25, wherein the plurality of request events further includes at least one request event having a non-deterministic order.

29. The computer-readable medium according to claim 22, wherein the plurality of request events have a non-deterministic order.

30. The computer-readable medium according to claim 29, wherein the plurality of non-deterministic order request events include an error event.

31. The computer-readable medium according to claim 22, wherein the step of forming the event pipeline corresponding to the context object forms the event pipeline as a separate instance for each HTTP request received at the host application from a client application.

32. The computer-readable medium according to claim 22, wherein the step of forming the context object includes a step of parsing the received HTTP request to form the context object.

* * * * *